(12) United States Patent
Katano

(10) Patent No.: US 8,252,471 B2
(45) Date of Patent: Aug. 28, 2012

(54) FUEL CELL SYSTEM

(75) Inventor: Koji Katano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/002,822

(22) PCT Filed: Jun. 17, 2009

(86) PCT No.: PCT/JP2009/002751
§ 371 (c)(1),
(2), (4) Date: Jan. 6, 2011

(87) PCT Pub. No.: WO2010/004688
PCT Pub. Date: Jan. 14, 2010

(65) Prior Publication Data
US 2011/0117467 A1    May 19, 2011

(30) Foreign Application Priority Data

Jul. 11, 2008 (JP) .................................. 2008-181171

(51) Int. Cl.
*H01M 8/04* (2006.01)
(52) U.S. Cl. ........ 429/442; 429/433; 429/449; 429/448; 429/447; 429/443
(58) Field of Classification Search .................. 429/442, 429/433, 449, 448, 447, 443
See application file for complete search history.

(56) References Cited

FOREIGN PATENT DOCUMENTS

| JP | 2005-267969 A | 9/2005 |
| JP | 2006-147150 A | 6/2006 |
| JP | 2006-333543 A | 12/2006 |
| JP | 2007-012419 A | 1/2007 |
| JP | 2007-066554 A | 3/2007 |
| JP | 2007-123029 A | 5/2007 |
| JP | 2007-134066 A | 5/2007 |
| JP | 2007-182900 A | 7/2007 |

OTHER PUBLICATIONS

Translation of International Preliminary Report on Patentability of PCT/JP2009/002751.

*Primary Examiner* — Helen O Conley
(74) *Attorney, Agent, or Firm* — Kenyon & Kenyon LLP

(57) ABSTRACT

A first detection line is set in a lower temperature range than a limit line representing an upper limit temperature of a motor allowed by an inverter and represents a reference motor temperature at a required output for fuel cells as a temperature criterion where a controller changes over the means for achieving the sufficient hydrogen stoichiometric ratio from recycling hydrogen with a circulation pump to increasing the hydrogen concentration. When the motor temperature reaches or exceeds the first detection line at the required output for the fuel cells, the controller prevents an increase in rotation speed of the motor and regulates the openings of a shutoff valve and a regulator to increase the concentration of hydrogen supplied from a hydrogen tank to the fuel cells and thereby increase the hydrogen supply pressure. This arrangement effectively prevents an increase of the motor temperature, while achieving the sufficient hydrogen stoichiometric ratio.

3 Claims, 6 Drawing Sheets

FUEL CELL SYSTEM

This is a 371 national phase application of PCT/JP2009/002751 filed 17 Jun. 2009, which claims priority of Japanese Patent Application No. 2008-181171 filed 11 Jul. 2008, the contents of which are incorporated herein by reference.

TECHNICAL FIELD

The present invention relates to a fuel cell system equipped with a circulation pump configured to recirculate a fuel gas exhaust discharged from a fuel gas exhaust outlet of fuel cells to a fuel gas supply inlet of the fuel cells.

BACKGROUND ART

In a fuel cell system, a circulation pump is generally used to recirculate and recycle an anode off-gas discharged from a fuel cell stack to a supply inlet of the fuel cell stack. The circulation pump has a motor, and the fuel gas exhaust is recirculated to the fuel cell stack by controlling the rotation speed of the motor. In this fuel cell system, when the temperature of the motor of the circulation pump exceeds a preset temperature level, output control of fuel cells may be performed to protect the motor from a potential damage.

Patent Document 1: Japanese Patent Laid-Open No. 2006-333543
Patent Document 2: Japanese Patent Laid-Open No. 2007-66554
Patent Document 3: Japanese Patent Laid-Open No. 2007-182900

SUMMARY OF THE INVENTION

The output control of the fuel cells, however, undesirably lowers a stoichiometric ratio representing a ratio of "an amount of fuel gas used for power generation" to "an amount of fuel gas supplied to the fuel cells" from being lowered without increasing the rotation speed of the circulation pump and thereby decreases the power generation voltage of the fuel cells.

By taking into account the issue discussed above, there is a need for preventing a temperature increase of a motor of a circulation pump, while achieving a sufficient stoichiometric ratio.

In order to address at least part of the need described above, the present invention provides various embodiments and applications described below.

According to one aspect of the invention, the present invention is directed to a fuel cell system. The fuel cell system includes a fuel cell configured to generate electric power through electrochemical reactions of a fuel gas and an oxidizing gas, a reservoir configured to store the fuel gas, a supply piping arranged to connect the fuel cell with the reservoir, a regulator configured to regulate a supply pressure of the fuel gas from the reservoir to the fuel cell, a circulation pump configured to recirculate a fuel off-gas discharged from the fuel cell to the supply piping, and a measuring instrument configured to measure a pump temperature representing temperature of the circulation pump. The fuel cell system also has a controller configured to, when the pump temperature reaches or exceeds a preset first temperature, prevent an increase in rotation speed of the circulation pump and control the regulator to increase the supply pressure of the fuel gas from the reservoir to the fuel cell.

When the temperature of the circulation pump reaches or exceeds the preset first temperature, the fuel cell system according to this aspect of the invention prevents an increase in rotation speed of the circulation pump and increases the supply pressure of the fuel gas from the reservoir to the fuel cell. This arrangement effectively prevents a stoichiometric ratio representing a ratio of 'an amount of fuel gas used for power generation' to 'an amount of fuel gas supplied to the fuel cell' from being lowered without increasing the rotation speed of the circulation pump, thus preventing a decrease in power generation efficiency of the fuel cell.

In one preferable embodiment of the fuel cell system, the controller reduces the rotation speed of the circulation pump. Reducing the rotation speed of the circulation pump leads to relieving a load of the circulation pump. The fuel cell system of this embodiment thus effectively prevents a temperature increase of the circulation pump.

In another preferable embodiment of the fuel cell system, the circulation pump has a restrictor configured to restrict an output of the circulation pump when the pump temperature exceeds a preset second temperature, which is higher than the first temperature. The first temperature and the second temperature are set such that a temperature difference between the first temperature and the second temperature decreases with a decrease in required output for the fuel cell. Namely the fuel cell system of this embodiment sets the first temperature and the second temperature such that the temperature difference between the first temperature and the second temperature decreases with a decrease in load of the fuel cell. In the low load condition, the circulation pump has a small amount of heat generation and a low temperature increase rate. This extends a time period for increasing the pump temperature from the first temperature to the second temperature at a preset required output. The fuel cell system of this embodiment controls the rotation speed of the circulation pump and the supply pressure of the fuel gas from the reservoir to the fuel cell according to the required output, thus enabling the fuel cell to generate electric power with the high efficiency.

In still another embodiment of the fuel cell system, the circulation pump has an independent restrictor configured to work independently of the fuel cell system and restrict operation of the circulation pump when the pump temperature reaches or exceeds the second temperature. The controller stops operation of the circulation pump when the pump temperature exceeds a third temperature, which is set to be higher than the first temperature but lower than the second temperature. In the fuel cell system of this embodiment, in the case where the control of preventing an increase in rotation speed of the circulation pump does not stop a further temperature increase of the circulation pump, the controller stops the circulation pump before the independent restrictor working independently of the fuel cell system restricts the operation of the circulation pump. The fuel cell system of this embodiment effectively prevents a temperature increase of the circulation pump, while assuring the smooth operation control of the circulation pump.

In another embodiment of the fuel cell system, the controller terminates the supply pressure control of the fuel gas from the reservoir to the fuel cell and the control for preventing an increase in rotation speed of the circulation pump when the pump temperature does not exceed a fourth temperature, which is lower than the first temperature. When the pump temperature decreases to or below the fourth temperature, the fuel cell system of this embodiment terminates the control by the controller. The operation state of the fuel cell system is thus returned to normal operations.

The invention may be actualized by any of other various applications. For example, the characteristics of the respective embodiments discussed above may be adequately combined or partly omitted.

DESCRIPTION OF EMBODIMENTS

A. First Embodiment
A-1. General Configuration of Fuel Cell System

Figure 1:
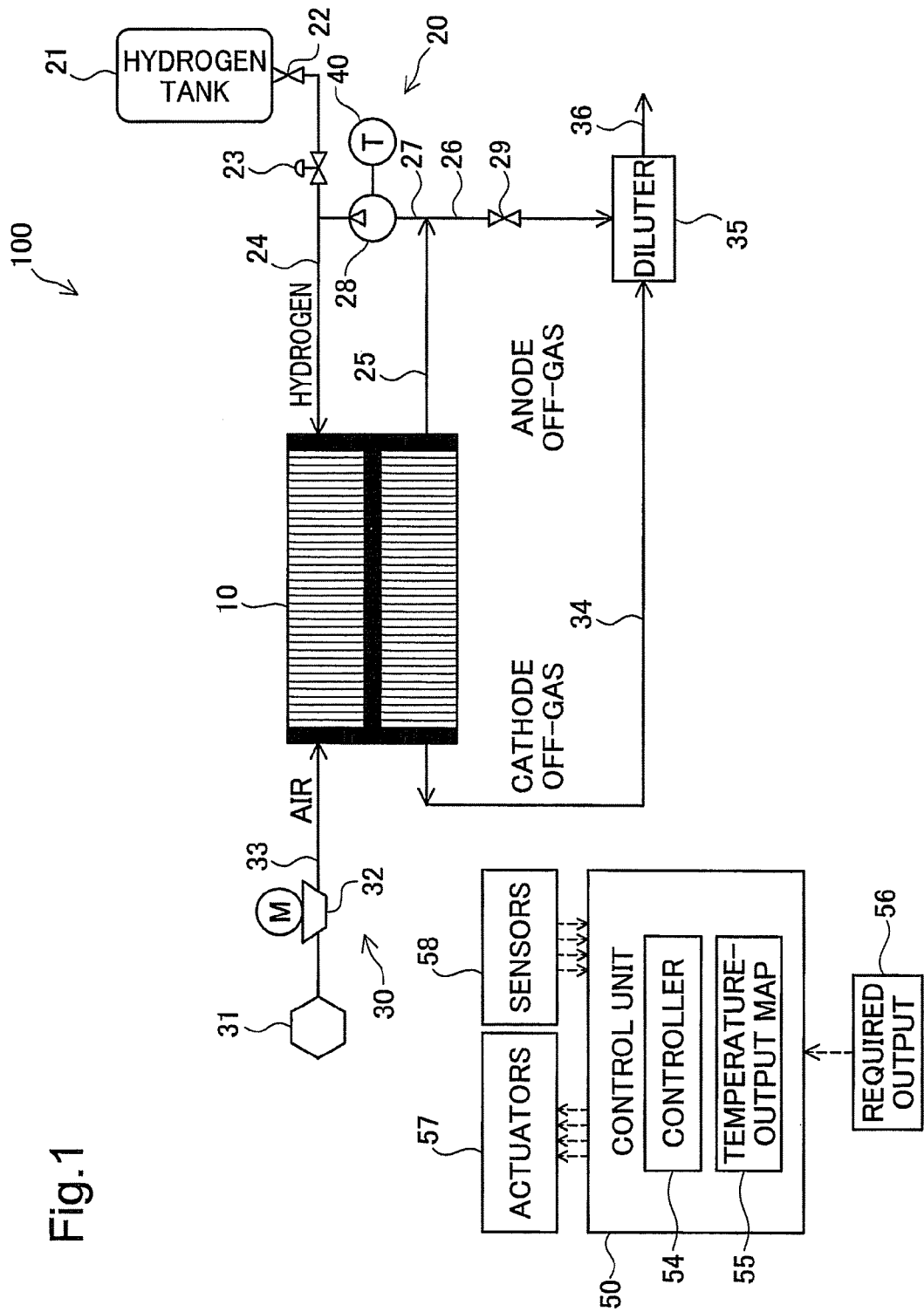
FIG. 1 is an explanatory diagrammatic representation of the configuration of a fuel cell system 100 according to a first embodiment.

FIG. 1 is an explanatory diagrammatic representation of a fuel cell system 100 mounted on a vehicle according to one embodiment of the invention. The fuel cell system 100 includes fuel cells 10 configured to generate electric power through electrochemical reactions, fuel gas-related equipment 20 configured to supply a fuel gas to and discharge a fuel gas exhaust from the fuel cells 10, an oxidizing gas-related equipment 30 configured to supply an oxidizing gas to and discharge an oxidizing gas exhaust from the fuel cells 10, and a control unit 50 configured to control the fuel cell system 100.

The fuel cells 10 are implemented as polymer electrolyte fuel cells, which generate electric power through electrochemical reactions of hydrogen as the fuel gas and the air as the oxidizing gas supplied to membrane-electrode assemblies consisting of electrolyte membranes, anodes, and cathodes.

The fuel gas-related equipment 20 includes a hydrogen tank 21, a shutoff valve 22, a regulator 23, a circulation pump 28, a purge valve 29, pipings 24, 25, 26, and 27, and a temperature sensor 40 used to measure the temperature of a motor of the circulation pump 28. The temperature sensor 40 is provided as a separate component from the circulation pump 28 in the illustration of FIG. 1, but may be incorporated in the circulation pump 28. The high-pressure hydrogen stored in the hydrogen tank 21 is subject to pressure regulation and supply control by the shutoff valve 22 and the regulator 23 and is supplied through the piping 24 to the anodes of the fuel cells 10 as the fuel gas. A fuel gas exhaust from the anodes (hereafter referred to as anode off-gas) goes through the piping 25, the piping 27, the circulation pump 28, and the piping 24 and is recirculated into the fuel cells 10. The hydrogen tank 21, the circulation pump 28, and the temperature sensor 40 in the first embodiment respectively correspond to the 'reservoir', the 'circulation pump', and the 'measuring instrument' in the claims of the invention. The combination of the shutoff valve 22 and the regulator 23 in the first embodiment is equivalent to the 'regulator' in the claims of the invention. The piping 24 of the first embodiment corresponds to the 'supply piping' in the claims of the invention.

The piping 25 is connected to the branch piping 26, which is equipped with the purge valve 29. During recirculation of the anode off-gas, the purge valve 29 is generally closed. The purge valve 29 is opened at a predetermined timing to introduce the anode off-gas through the piping 26 to a diluter 35. The anode off-gas subject to dilution in the diluter 35 is then released out of the fuel cell system. This arrangement effectively prevents an increase in concentration of impurities in the anode off-gas.

The oxidizing gas-related equipment 30 includes an air cleaner 31, an air compressor 32, the diluter 35, and pippins 33, 34, and 36. The intake air from the air cleaner 31 is compressed by the air compressor 32 and is supplied through the piping 33 to the cathodes of the fuel cells 10 as the oxidizing gas. An oxidizing gas exhaust from the cathodes (hereafter referred to as cathode off-gas) is introduced through the piping 34 to the diluter 35.

The diluter 35 mixes the cathode off-gas with the anode off-gas introduced thereto at the predetermined timing to dilute the concentration of hydrogen included in the anode off-gas. An emission gas discharged from the diluter 35 goes through the piping 36 and is released out of the fuel cell system 100.

The respective components explained above are under control of the control unit 50. The control unit 50 is implemented as a microcomputer including a CPU, a RAM, and a ROM. The control unit 50 loads and executes programs stored in the ROM, on the RAM to receive a required output 56 and signals from various sensors 58, output drive signals to the regulator 23, the air compressor 32, the purge valve 29, and various actuators 57 of the fuel cell system 100, and control the overall operations of the fuel cell system 100. The temperature sensor 40 is one of the various sensors 58.

The control unit 50 includes a controller 54 and a temperature-output map 55. The controller 54 serves to adjust the rotation speed of the circulation pump 28 according to the required output 56. The controller 54 refers to the temperature-output map 55 and controls the rotation speed of the circulation pump 28 and the hydrogen supply pressure from the hydrogen tank 21 to the fuel cells 10 based on the measured temperature of the circulation pump 28, thereby efficiently achieving the sufficient hydrogen stoichiometric ratio. The term 'hydrogen stoichiometric ratio' herein denotes a ratio of the 'amount of hydrogen used for power generation' to the 'amount of hydrogen supplied to the fuel cells 10'. When the measured temperature of the circulation pump 28 is not lower than a specific temperature set in the temperature-output map 55, the controller 54 prevents an increase in rotation speed of the circulation pump 28 and controls the shutoff valve 22 and the regulator 23 to increase the hydrogen supply pressure from the hydrogen tank 21 to the fuel cells 10. The temperature-output map 55 and the achievement of the sufficient hydrogen stoichiometric ratio will be described later in detail. The controller 54 in the first embodiment corresponds to the 'controller' in the claims of the invention.

A2. Functional Blocks of Circulation Pump

Figure 2:
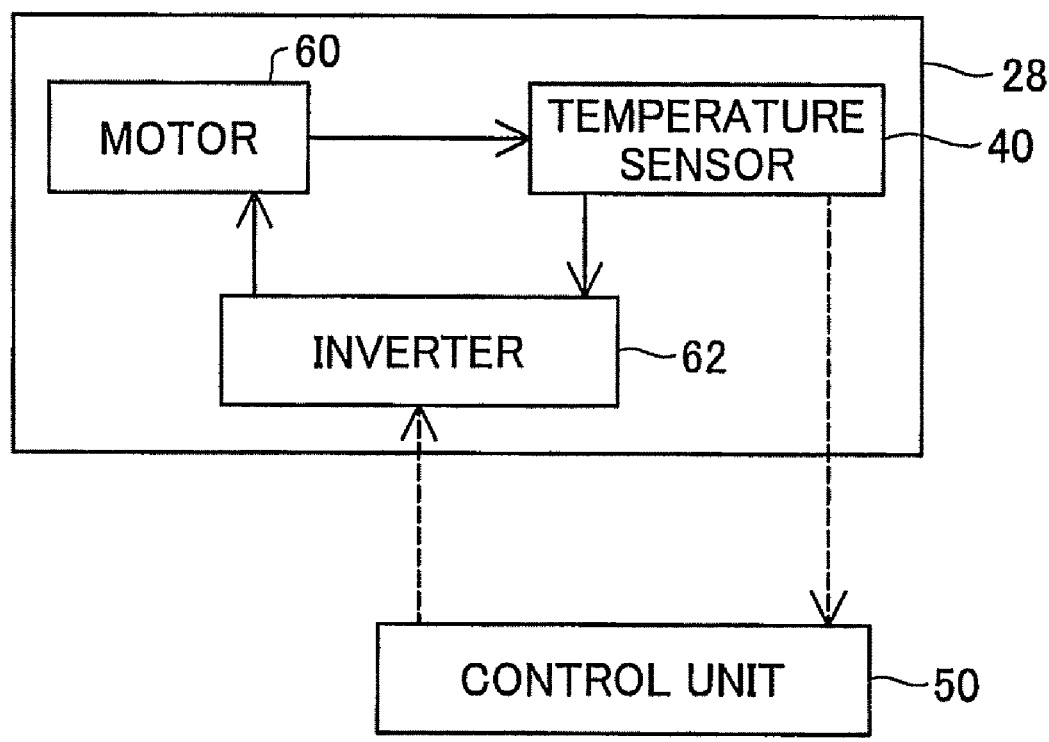
FIG. 2 is an explanatory diagrammatic representation of functional blocks of a circulation pump 28 in the first embodiment.

FIG. 2 is an explanatory diagrammatic representation of functional blocks of the circulation pump 28 in the first embodiment. The circulation pump 28 includes a motor 60, the temperature sensor 40, and an inverter 62. With referring to FIG. 2, in the configuration of the first embodiment, the temperature sensor 40 and the inverter 62 are connected to the control unit 50. The inverter 62 is one of the various actuators 57.

The inverter 62 drives the motor 60 as the drive source of the circulation pump 28, in response to an instruction from the control unit 50. The temperature sensor 40 measures the temperature of the motor 60 in the circulation pump 28 and informs the control unit 50 and the inverter 62 of the measured temperature. When the measured temperature of the motor 60 is equal to or higher than a second temperature (explained later), the inverter 62 restricts the output of the motor 60, irrespective of the instruction from the control unit 50. In the first embodiment, the 'restricting' includes stopping the motor 60. In the description of the embodiment hereafter, the temperature of the motor 60 measured by the temperature sensor 40 may be referred to as 'motor temperature'.

A3. Temperature-Output Map

Figure 3:
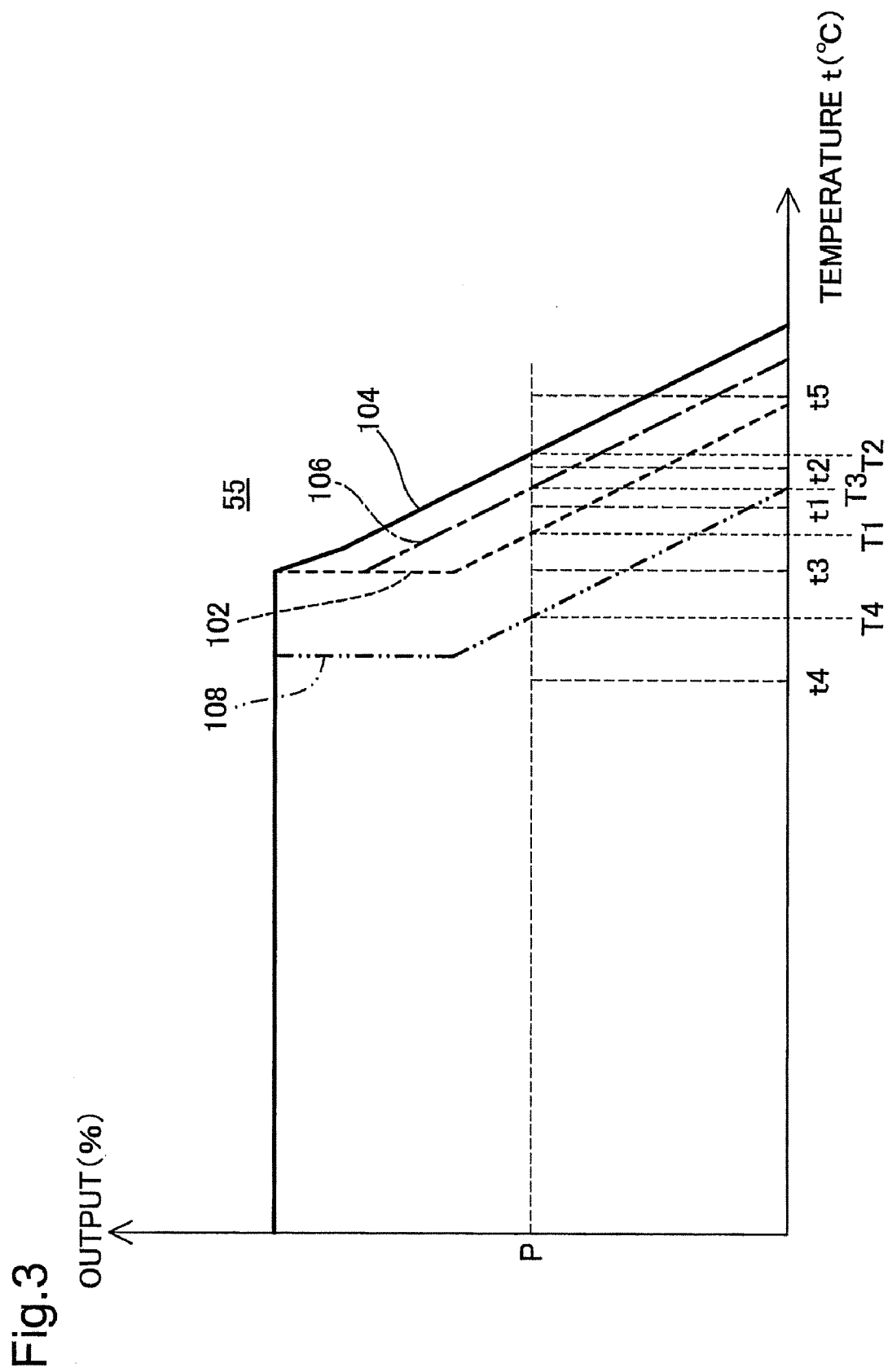
FIG. 3 is an explanatory diagrammatic representation of a temperature-output map 55 used in the first embodiment.

FIG. 3 is an explanatory diagrammatic representation of the temperature-output map 55 used in the first embodiment. The temperature-output map 55 shows a relation of the temperature of the motor 60 to the output of the fuel cells 10, with the temperature t (° C.) of the motor 60 measured by the temperature sensor 40 as the abscissa and the output (%) of the fuel cells 10 as the ordinate. In the temperature-output map 55, the output of the fuel cells is expressed as the ratio of a required output to a maximum output of the fuel cells. For example, when fuel cells have a maximum output of '100' and an output required for the fuel cells (required output) at a preset temperature 't' is '50', the output of the fuel cells is given as (50/100)×100=50%.

In the temperature-output map 55, a first detection line 102 shown by a broken line represents a reference temperature of the motor 60 (in the following description of the first embodiment, referred to as 'first temperature') at a required output for the fuel cells 10 as a temperature criterion where the controller 54 changes over the means for achieving the sufficient hydrogen stoichiometric ratio from recycling hydrogen with the circulation pump 28 to increasing the hydrogen concentration. For example, the temperature-output map 55 gives a first temperature T1 at a required output P. When the temperature of the motor 60 at the required output for the fuel cells 10 reaches or exceeds the first detection line 102 or is equal to or higher than the first temperature, the controller 54 prevents an increase in rotation speed of the motor 60 and regulates the openings of the shutoff valve 22 and the regulator 23 to increase the concentration of hydrogen supplied from the hydrogen tank 21 to the fuel cells 10 and thereby increase the hydrogen supply pressure. Here the terminology of 'preventing an increase in rotation speed of the motor 60' includes maintaining or even reducing the rotation speed of the motor 60.

In the temperature-output map 55, a limit line 104 shown by a thick solid line is set in a higher temperature range than the first detection line 102 and represents an upper limit temperature of the motor 60 (in the following description of the first embodiment, referred to as 'second temperature') allowed by the inverter 62 at the required output for the fuel cells 10. For example, the temperature-output map 55 gives a second temperature T2 at the required output P. The motor 60 is sensitive to heat and has an increased failure rate with a temperature increase. When the temperature of the motor 60 at the required output for the fuel cells 10 reaches or exceeds the limit line 104 or is equal to or higher than the second temperature, the inverter 62 stops the motor 60, irrespective of the instruction from the control unit 50 and thereby protects the motor 60 from a potential failure. Stopping the motor 60 stops the function of the circulation pump 28. In the first embodiment, the limit line 104 represents a temperature curve uniquely set in advance for the inverter 62.

In the temperature-output map 55, a second detection line 106 shown by a one-dot chain line is set in a higher temperature range than the first detection line 102 but in a lower temperature range than the limit line 104 and represents an upper limit temperature of the motor 60 (in the following description of the first embodiment, referred to as 'third temperature') allowed by the controller 54 at the required output for the fuel cells 10. Namely the third temperature is set to be higher than the first temperature but lower than the second temperature at a preset required output. For example, the temperature-output map 55 gives a third temperature T3 at the required output P. When the temperature of the motor 60 at the required output for the fuel cells 10 exceeds the second detection line 106 or is higher than the third temperature, the controller 54 stops the motor 60.

In the temperature-output map 55, a recovery line 108 shown by a two-dot chain line is set in a lower temperature range than the first detection line 102 and represents a recovery temperature of the motor 60 (in the following description of the first embodiment, referred to as 'fourth temperature') at the required output for the fuel cells 10 as a temperature criterion where the controller 54 terminates the control on the motor 60, the shutoff valve 22, and the regulator 23 and returns the operation state to normal operations. For example, the temperature-output map 55 gives a fourth temperature T4 at the required output P.

A4. Hydrogen Stoichiometric Ratio Control Process

Figure 4:
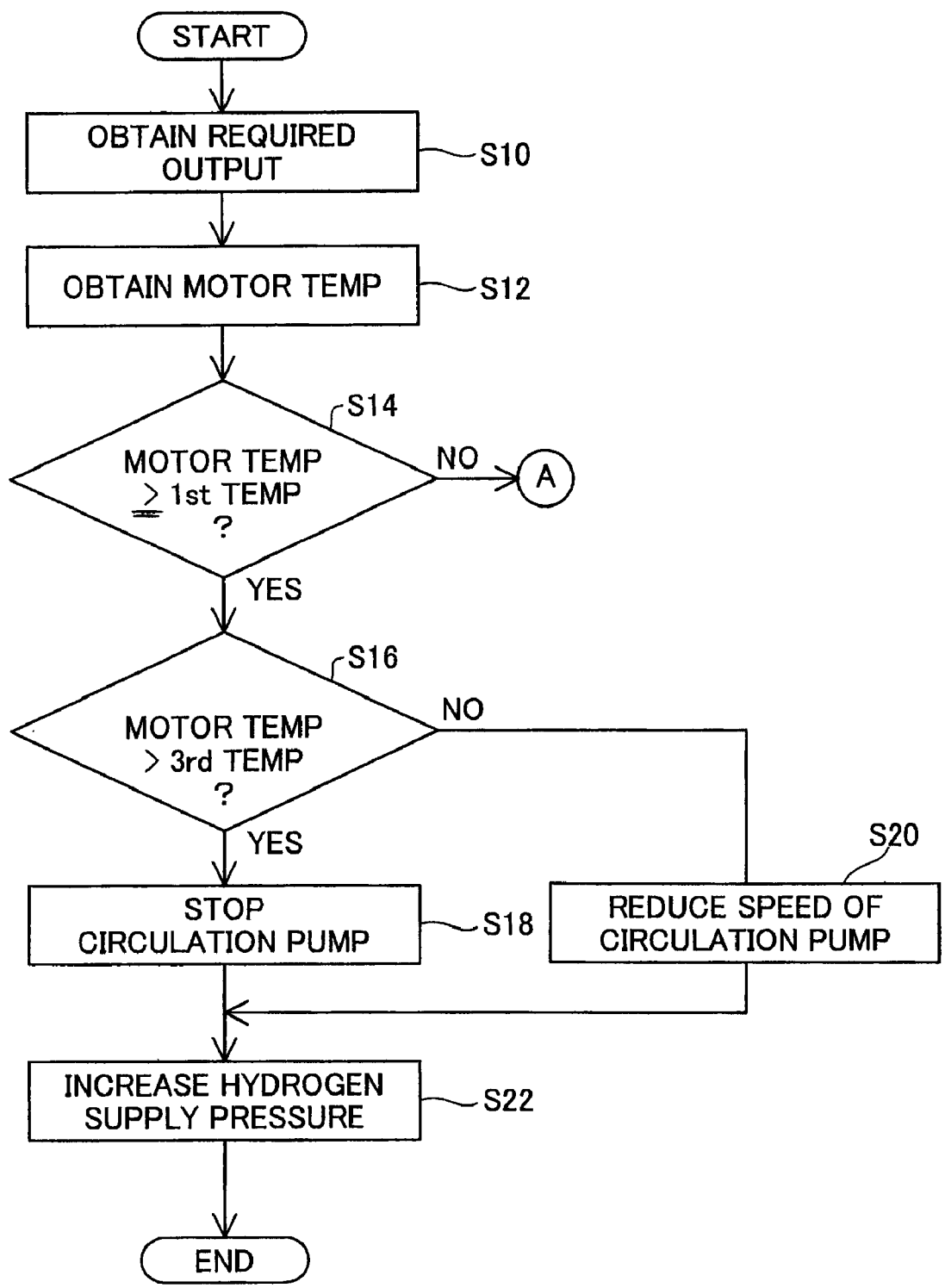
FIG. 4 is a flowchart showing a hydrogen stoichiometric ratio control process performed in the first embodiment.
Figure 5:
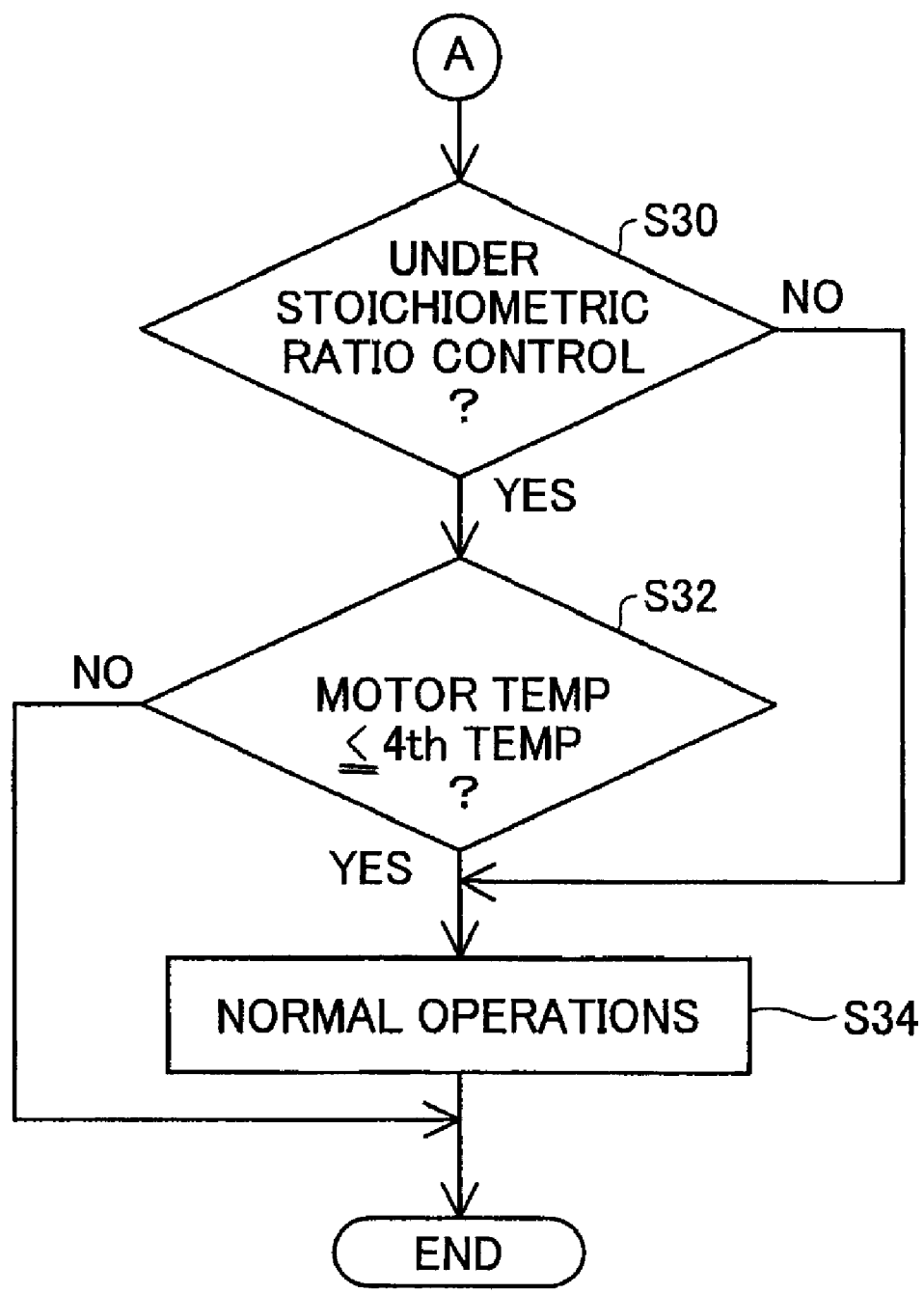
FIG. 5 is a flowchart showing the hydrogen stoichiometric ratio control process performed in the first embodiment.

The control of the hydrogen stoichiometric ratio for the fuel cell system 100 is described with reference to FIGS. 3 through 5. FIGS. 4 and 5 are flowcharts showing a hydrogen stoichiometric ratio control process performed in the first embodiment. The hydrogen stoichiometric ratio control process is executed through the control of the respective functional blocks by the control unit 50. The following description is on the assumption that the hydrogen stoichiometric ratio control process is executed by the control unit 50.

The control unit 50 obtains the required output 56 (step S10), obtains a motor temperature from the temperature sensor 40 (step S12), and determines whether the obtained motor temperature is equal to or higher than the first temperature (step S14). More specifically, the control unit 50 determines whether the motor temperature at the required output for the fuel cells 10 reaches or exceeds the first detection line 102. For example, with referring to the temperature-output map 55 of FIG. 3, when the obtained motor temperature is 't1' at the required output P, the control unit 50 determines that the motor temperature reaches or exceeds the first detection line 102 or is not lower than the first temperature.

When the motor temperature is equal to or higher than the first temperature (step S14: Yes), the control unit 50 subsequently determines whether the motor temperature is higher than the third temperature (step S16). More specifically, the control unit 50 determines whether the motor temperature at the required output for the fuel cells 10 exceeds the second detection line 106. For example, with referring to the temperature-output map 55 of FIG. 3, when the obtained motor temperature is 't2' at the required output P, the control unit 50 determines that the motor temperature exceeds the second detection line 106 or is higher than the third temperature.

When the motor temperature is higher than the third temperature (step S16: Yes), the control unit 50 gives an instruction to the inverter 62 to stop the motor 60 (step S18). The inverter 62 receives the stop instruction for the motor 60 and cuts off the power supply to the motor 60. The power cutoff stops the motor 60 and thereby prevents an increase of the motor temperature. According to a preferable procedure, the control unit 50 continuously opens the purge valve 29, simultaneously with the stop instruction for the motor 60. This efficiently increases the hydrogen stoichiometric ratio.

When the motor temperature is not higher than the third temperature or more specifically when the motor temperature is higher than the first temperature but is lower than the third temperature (step S16: No), the control unit 50 gives an instruction to the inverter 62 to reduce the rotation speed of the motor 60 (step S20). The rotation speed of the motor 60 may be maintained, instead of being reduced in the first embodiment.

After stopping the motor 60 of the circulation pump 28 or reducing the rotation speed of the motor 60, the control unit 50 regulates the openings of the shutoff valve 22 and the regulator 23 to increase the hydrogen supply pressure from the hydrogen tank 21 to the fuel cells 10 (step S22). This series of control achieves the sufficient hydrogen stoichiometric ratio of the fuel cells by increasing the hydrogen supply pressure to increase the concentration of hydrogen supplied to the fuel cells without increasing the rotation speed of the motor 60 of the circulation pump 28.

When the motor temperature is not equal to or higher than the first temperature (step S14: No), the control unit 50 determines whether the current state is under stoichiometric ratio control (step S30). The stoichiometric ratio control includes the motor speed control (steps S18 and S20) and the hydrogen supply pressure control (step S22). During any of these controls, the current state of the fuel cell system 100 is determined to be under stoichiometric ratio control.

When the current state is under stoichiometric ratio control (step S30: Yes), the control unit 50 determines whether the motor temperature is equal to or lower than the fourth temperature (step S32). More specifically, the control unit 50 determines whether the motor temperature at the required output for the fuel cells 10 does not exceed the recovery line 108. For example, with referring to the temperature-output map 55 of FIG. 3, when the obtained motor temperature is 't3' at the required output P, the control unit 50 determines that the motor temperature does not exceed the recovery line 108 or is not higher than the fourth temperature.

When the motor temperature is equal to or lower than the fourth temperature (step S32: Yes), the control unit 50 terminates the motor speed control (steps S18 and S20) and the hydrogen supply pressure control (step S22) and performs the operations according to the required output (i.e., the operations in a normal mode) (step S34). According to a preferable procedure, the control unit 50 simultaneously terminates the state of continuous valve-opening of the purge valve 29 (changes the state to valve-closing).

When the motor temperature is not equal to or lower than the fourth temperature or more specifically when the motor temperature is lower than the first temperature but is higher than the fourth temperature under stoichiometric ratio control (step S32: No), the control unit 50 maintains the current operation state under stoichiometric ratio control.

When the motor temperature is lower than the first temperature (step S14: No) and when the current state is not under stoichiometric ratio control (step S30: No), the control unit 50 maintains the operations in the normal mode (step S34).

As described above, when the temperature 't' of the circulation pump 28 reaches or exceeds the first temperature, the fuel cell system 100 of the first embodiment prevents an increase in rotation speed of the circulation pump 28 and increases the hydrogen supply pressure from the hydrogen tank 21 to the fuel cells 10. This series of control achieves the sufficient hydrogen stoichiometric ratio of the fuel cells 10 without increasing the rotation speed of the circulation pump 28. Such control effectively prevents a decrease of the power generation efficiency of the fuel cells, while protecting the circulation pump 28 from a potential damage.

The fuel cell system 100 of the first embodiment reduces the rotation speed of the circulation pump 28, thereby relieving the load of the circulation pump 28 and preventing a temperature increase of the circulation pump 28.

In the fuel cell system 100 of the first embodiment, in the case where the control of preventing an increase in rotation speed of the circulation pump 28 does not stop a further temperature increase of the circulation pump 28, the controller 54 stops the circulation pump 28 before the inverter 62 works independently of the fuel cell system 100 to stop the power supply to the motor 60 and thereby stop the circulation pump 28. The inverter 62 may be designed to stop the motor 60 according to the motor temperature, independently of the controller 54. Forcible operation stop of the circulation pump 28 by the inverter 62 makes it difficult for the controller 54 to smoothly restart the circulation pump 28 or smoothly control the operations of the circulation pump 28. The control process of the first embodiment causes the controller 54 to stop the circulation pump 28, before the inverter 62 forcibly stops the circulation pump 28 independently of the controller 54. This arrangement facilitates the controller 54 to restart the circulation pump 28 or control the operations of the circulation pump 28. The fuel cell system 100 of the first embodiment effectively prevents a temperature increase of the circulation pump 28, while assuring the smooth operation control of the circulation pump 28.

B. Second Embodiment

The temperature-output map 55 of the first embodiment is designed to have the first detection line with a substantially equal slope to that of the limit line. A temperature-output map of a second embodiment is, on the other hand, designed to have a first detection line with a smaller slope than that of a limit line.

B1. Temperature-Output Map

Figure 6:
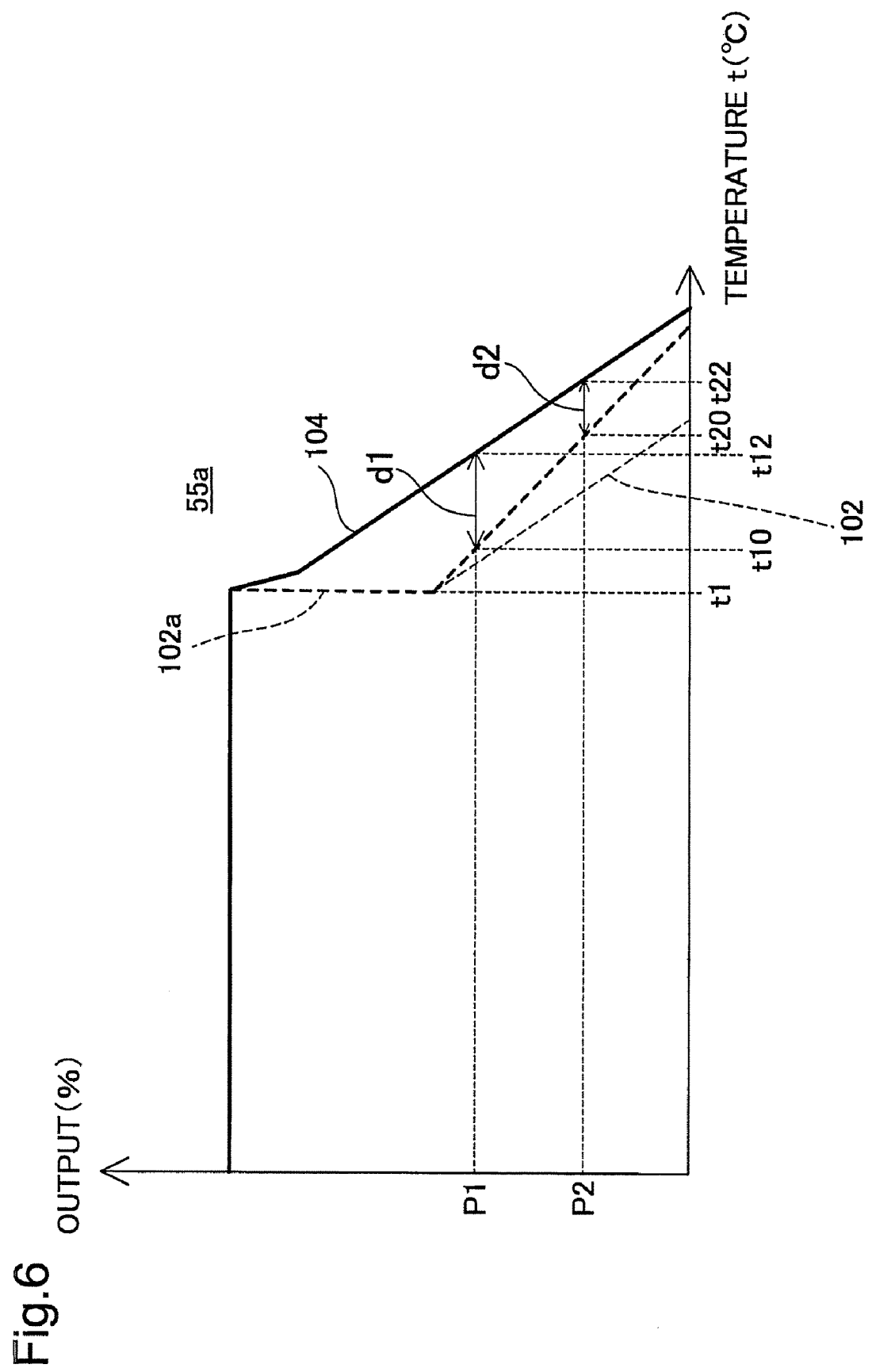
FIG. 6 is an explanatory diagrammatic representation of a temperature-output map 55a used in a second embodiment.

FIG. 6 is an explanatory diagrammatic representation of a temperature-output map 55*a* used in the second embodiment. The temperature-output map 55*a* shows a relation of motor temperature to the output of the fuel cells 10, with the like abscissa and ordinate to those of the temperature-output map 55 described in the first embodiment. The temperature-output map 55*a* has a first detection line 102*a* and a limit line 104 but does not have a second detection line 106. For the simplicity of illustration, a recovery line 108 is omitted from the illustration of FIG. 6.

With referring to the temperature-output map 55*a* of FIG. 6, the first detection line 102*a* has a smaller slope than the slope of the limit line 104. There is accordingly a difference between a first temperature and a second temperature set to decrease with an increase of the motor temperature. Namely the difference between the first temperature and the second temperature is set to decrease with a decrease of the load of the fuel cells 10. For example, in the temperature-output map 55*a*, there is a temperature difference d1 between a first temperature t10 and a second temperature t12 at a required output P1 for the fuel cells 10. There is a temperature difference d2, which is smaller than d1, between a first temperature t20 and a second temperature t22 at a required output P2 for the fuel cells 10.

In the low load condition, the circulation pump 28 has a small amount of heat generation and a low temperature increase rate. Under the control of the first embodiment based on the first detection line 102, the lower load condition leads to the longer time period elapsed until the motor temperature reaches the limit line 104 after exceeding the first detection line 102 at a preset required output. During the time period until the motor temperature reaches the second temperature after exceeding the first temperature, the control achieves the sufficient hydrogen stoichiometric ratio by preventing an increase of the motor speed and regulating the concentration of hydrogen supplied to the fuel cells. As is known in the art, recirculation of the anode off-gas with the circulation pump 28 has a higher efficiency for achieving the sufficient hydrogen stoichiometric ratio than an increase of the hydrogen concentration. The temperature-output map 55a of the second embodiment is accordingly set to have a smaller temperature difference between the first temperature and the second temperature in the lower load condition. Namely the second embodiment performs the control for achieving the sufficient hydrogen stoichiometric ratio by recirculation of the anode off-gas with the circulation pump 28 for a longer time period in the low load condition, compared with the first embodiment.

As described above, in the fuel cell system 100 of the second embodiment, the temperature-output map 55a is set to decrease the temperature difference between the first temperature and the second temperature in the lower load condition of the fuel cells 10. The time period until the motor temperature reaches the limit line 104 after exceeding the first detection line 102a is thus adjustable according to the load of the fuel cells. This arrangement maximizes the operation time of the motor 60 to prevent a decrease of the power generation efficiency of the fuel cells 10 in the low load condition, while protecting the motor 60 from a potential damage.

C. Other Aspects (1) In the first embodiment, when the motor temperature exceeds the third temperature (second detection line), the controller 54 stops the motor 60. Another criterion may be adopted for stopping the motor 60; for example, when the motor temperature exceeds the third temperature (second detection line) at a temperature increase rate of not less than a preset upper limit. The temperature increase rate is expressed by $\Delta T/\Delta t$, where $\Delta t$ denotes a preset time and $\Delta T$ represents an increased temperature of the motor 60 during the preset time $\Delta t$. This modified control stops the motor 60 only when the motor temperature increases over the third temperature at the temperature increase rate of not less than the preset upper limit. At a lower temperature increase rate, the motor 60 is assumed to be in the low load condition. It is accordingly expected to gradually lower the motor temperature by not requiring a stop of the motor 60 but reducing the rotation speed of the motor 60. Recirculation of the anode off-gas with the circulation pump 28 is the more effective means for achieving the sufficient hydrogen stoichiometric ratio, compared with an increase of the hydrogen concentration or the hydrogen supply pressure. In the state expected to have the low load of the motor 60, the control without stopping the motor 60 more effectively prevents a decrease of the power generation efficiency of the fuel cells 10.

(2) In the first embodiment described above, when the motor temperature exceeds the third temperature that is set to be higher than the first temperature but lower than the second temperature, the controller 54 stops the circulation pump 28. Setting the third temperature (second detection line) is, however, not essential. The output control may be performed to control the inverter 62 to reduce the rotation speed of the motor 60 when the motor temperature reaches or exceeds the second temperature (limit line). This modified control also increases the concentration of hydrogen supplied from the hydrogen tank 21 to the fuel cells 10 to increase the hydrogen supply pressure, thus achieving the sufficient hydrogen stoichiometric ratio. This arrangement prevents an abrupt voltage drop of the fuel cells 10.

The present invention is described above in detail with reference to the preferable embodiments and their modifications. These embodiments and modifications are, however, to be considered in all aspects as illustrative and not restrictive. There may be many modifications, changes, alterations as well as the equivalency, without departing from the scope or spirit of the main characteristics of the present invention. The various constituents or components of the invention are described in various combinations and applications, which are not restrictive but are illustrative. The number of such constituents or components may be varied to a greater number or a less number, even a singular. All such modifications and changes that come within the meaning and range of equivalency of the claims are to be embraced within their scope.

The present application claims priority from Japanese patent application No. 2008-181171A filed on Jul. 11, 2008, the content of which is incorporated herein, in its entirety, by this reference.

What is claimed is:

1. A fuel cell system, comprising:
a fuel cell configured to generate electric power through electrochemical reactions of a fuel gas and an oxidizing gas;
a reservoir configured to store the fuel gas;
a supply piping arranged to connect the fuel cell with the reservoir;
a regulator configured to regulate a supply pressure of the fuel gas from the reservoir to the fuel cell;
a circulation pump configured to recirculate a fuel off-gas discharged from the fuel cell to the supply piping;
a measuring instrument configured to measure a pump temperature representing temperature of the circulation pump;
a restrictor provided on the circulation pump and configured to stop operation of the circulation pump when the pump temperature exceeds a second temperature, which is set to be higher than a preset first temperature used for determining a changeover of control from recycling hydrogen with the circulation pump to increasing a concentration of the fuel gas; and
a controller configured to, when the pump temperature does not exceed a third temperature that is set to be lower than the second temperature but higher than the first temperature, reduce or maintain a rotation speed of the circulation pump and control the regulator to perform a stoichiometric ratio control of increasing the supply pressure of the fuel gas from the reservoir to the fuel cell, and when the pump temperature exceeds the third temperature, to stop operation of the circulation pump and control the regulator to perform the stoichiometric ration control of increasing the supply pressure of the fuel gas from the reservoir to the fuel cell,
wherein the first and second temperatures are set such that a temperature difference between the first and second temperatures decreases with a decrease in required output for the fuel cell.

2. The fuel cell system in accordance with claim 1, wherein the restrictor is capable of stopping operation of the circulation pump, independently of the controller of the fuel cell system.

3. The fuel cell system in accordance with claim 1, wherein the controller terminates the stoichiometric ratio control of the supply pressure of the fuel gas and the operation control of the circulation pump when the pump temperature reaches a fourth temperature, which is lower than the first temperature.

* * * * *